US008890978B1

(12) United States Patent
Madhani et al.

(10) Patent No.: US 8,890,978 B1
(45) Date of Patent: Nov. 18, 2014

(54) ACCURATELY EXTRACTING INFORMATION USING MULTIPLE IMAGES

(75) Inventors: Sunil H. Madhani, Bangalore (IN); Samir Revti Kakkar, Bangalore (IN); Anu Sreepathy, Bangalore (IN)

(73) Assignee: Intuit Inc., Mountain View, CA (US)

( * ) Notice: Subject to any disclaimer, the term of this patent is extended or adjusted under 35 U.S.C. 154(b) by 71 days.

(21) Appl. No.: 13/431,559

(22) Filed: Mar. 27, 2012

(51) Int. Cl.
 *H04N 5/76* (2006.01)
(52) U.S. Cl.
 USPC ..................... 348/231.3; 348/222.1
(58) Field of Classification Search
 USPC ........................... 348/222.1, 231.3
 See application file for complete search history.

(56) References Cited

U.S. PATENT DOCUMENTS

| 6,975,360 | B2 * | 12/2005 | Slatter | 348/370 |
| 2010/0322519 | A1 * | 12/2010 | Kasuya et al. | 382/190 |
| 2012/0218444 | A1 * | 8/2012 | Stach | 348/241 |

\* cited by examiner

*Primary Examiner* — Gevell Selby
(74) *Attorney, Agent, or Firm* — Park, Vaughan, Fleming & Dowler LLP; Steven E. Stupp

(57) ABSTRACT

During an information-extraction technique, a user of the electronic device may be instructed by an application executed by an electronic device (such as a software application) to point an imaging sensor, which is integrated into the electronic device, toward a location on a document. For example, the user may be instructed to point a cellular-telephone camera toward a field on an invoice. After providing the instruction, the electronic device captures multiple images of the document by communicating a signal to the imaging device to acquire the images. Each of these images has an associated exposure setting with a different point of interest proximate to the location). Then, the electronic device stores the images and the points of interest. Furthermore, the electronic device analyzes the images to extract the information proximate to the location on the document.

20 Claims, 5 Drawing Sheets

ACCURATELY EXTRACTING INFORMATION USING MULTIPLE IMAGES

CROSS REFERENCE TO RELATED APPLICATIONS

This application relates to U.S. patent application Ser. No. 13/427,461, entitled "Accurately Extracting Information Based on Orthogonal Images," by Sunil Madhani et al., which was filed on 22 Mar. 2012, the contents of both of which are herein incorporated by reference.

BACKGROUND

The present disclosure relates to techniques for capturing multiple images of a document and accurately extracting information from the images.

The widespread availability of digital cameras and cellular telephones with integrated imaging sensors has led to a significant increase in digital photography and associated software applications that leverage information in the acquired images. For example, after a user captures an image of a document (such as a financial document) using a digital camera or a cellular telephone (which are each sometimes referred to as an 'electronic device'), a software application executing on the electronic device (such as a financial software application) can extract information from the image using optical character recognition. Then, at least in principle, the financial software application can use the extracted information to populate fields in a form or to perform a financial calculation.

However, in practice, the ability to extract useful information from an image (especially for use with a software application) is often restricted by the image quality. For example, depending on the image quality, errors may occur when extracting the information using optical character recognition. These errors can make it more difficult, if not impossible, for a software application (such as the financial software application) to subsequently use the extracted information.

As a consequence, after acquiring an image, the user may need to perform post-acquisition operations, such as: editing the image to crop the area of interest; correcting any errors that occurred in the extracted information; and, if the image is blurry or the area of interest was not captured, repeating the image-capture and/or the post-acquisition operations one or more times. Performing the image-capture and/or the post-acquisition operations once, let alone multiple times, is time-consuming and may consequently limit the willingness of users to acquire images or to use software applications that leverage the information in images.

SUMMARY

The disclosed embodiments relate to an electronic device that extracts information from a document. During operation, the electronic device (or an application executing on the electronic device) provides an instruction to a user to point an imaging device, which is integrated into the electronic device, at a location on the document. After providing the instruction, the electronic device captures multiple images of the document, where each of the images has an associated exposure setting with a different point of interest proximate to the location. Then, the electronic device stores the images and the points of interest. The electronic device also analyzes the images to extract the information proximate to the location on the document.

Note that the analysis may include optical character recognition. Moreover, a contribution of a given image in the analysis may be based on a corresponding weight. This weight may be based on a distance between a point of interest of the given image and a location of the information. For example, the weight may be larger when the distance is smaller. Alternatively or additionally, the weight may be based on differences between the information extracted from the given image and the other images.

In some embodiments, the analysis is based on historical information previously extracted from other documents.

Furthermore, the document may include a financial document (such as: an invoice, a bill and/or a financial vehicle) and/or the application may include a financial application.

In some embodiments, the electronic device erases the images after performing the analysis.

Note that the images may correspond to subsets of a field of view of the imaging sensor.

Moreover, the images may be acquired without the user performing an additional action, such as activating a physical button or a virtual icon (and, more generally, an image-activation mechanism) for the imaging sensor. Additionally, when acquiring the images, the electronic device may adjust, based on the points of interest, the subsets of the field of view (or image-capture zones) that are associated with the imaging device and/or the application.

Another embodiment provides a method that includes at least some of the operations performed by the electronic device.

Another embodiment provides a computer-program product for use with the electronic device. This computer-program product includes instructions for at least some of the operations performed by the electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an electronic device, a technique for extracting information, and a computer-program product (e.g., software) for use with the electronic device are described. During this information-extraction technique, a user of the electronic device may be instructed by an application executed by the electronic device (such as a software application) to point an imaging sensor, which is integrated into the electronic device, at a location on a document. For example, the user may be instructed to point a cellular-telephone camera at a field on an invoice. After providing the instruction, the electronic device captures multiple images of the document by communicating a signal to the imaging device to acquire the images. Each of these images has an associated exposure setting with a different point of interest proximate to the location. Then, the electronic device stores the images and the points of interest. Furthermore, the electronic device analyzes the images to extract the information proximate to the location on the document.

By facilitating accurate extraction of the information, the information-extraction technique may simplify the use of the imaging sensor, the application and, thus, the electronic device. In the process, the information-extraction technique may significantly improve the user experience when using the application and the electronic device, thereby increasing customer satisfaction, and sales of the application and the electronic device.

In the discussion that follows, a user may include: an individual (for example, an existing customer, a new customer, a service provider, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc.

Figure 1:
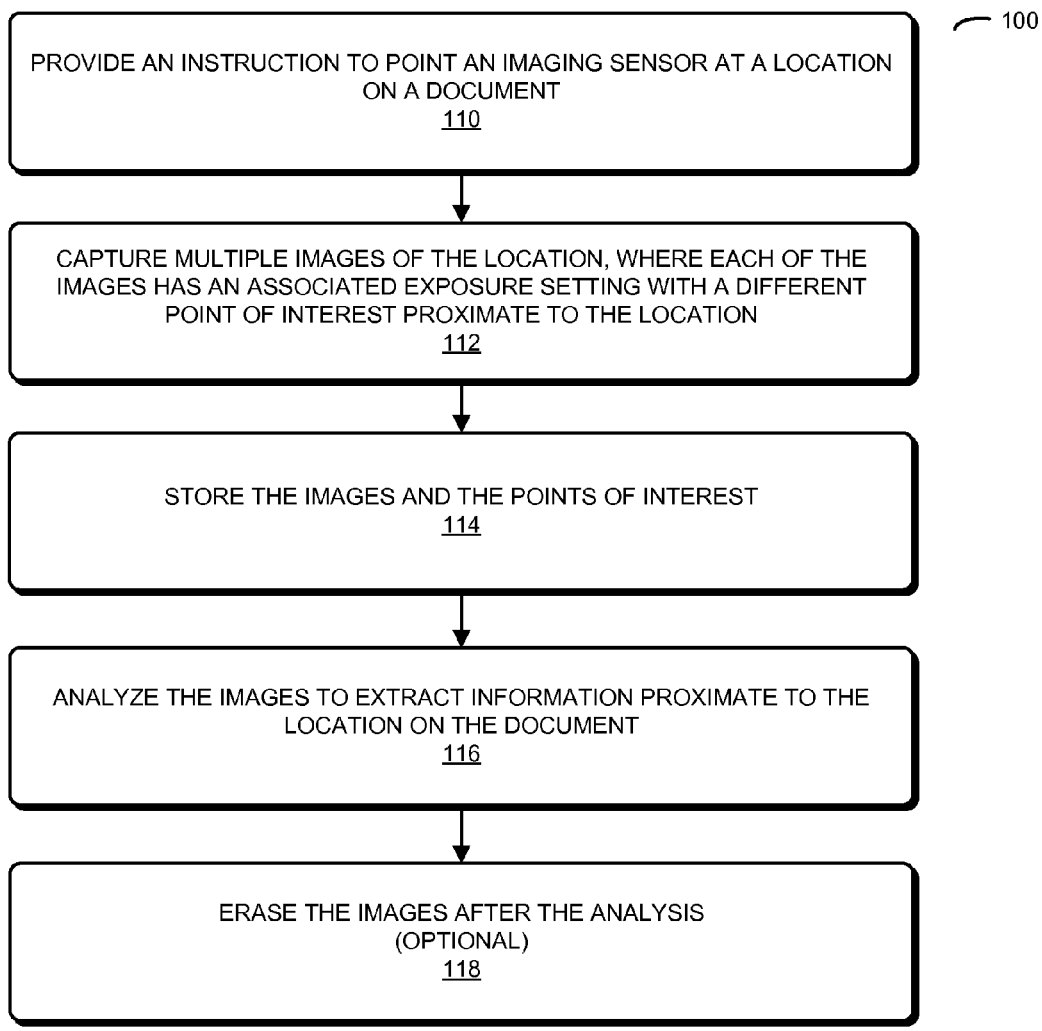
FIG. 1 is a flow chart illustrating a method for extracting information in accordance with an embodiment of the present disclosure.
Figure 4:
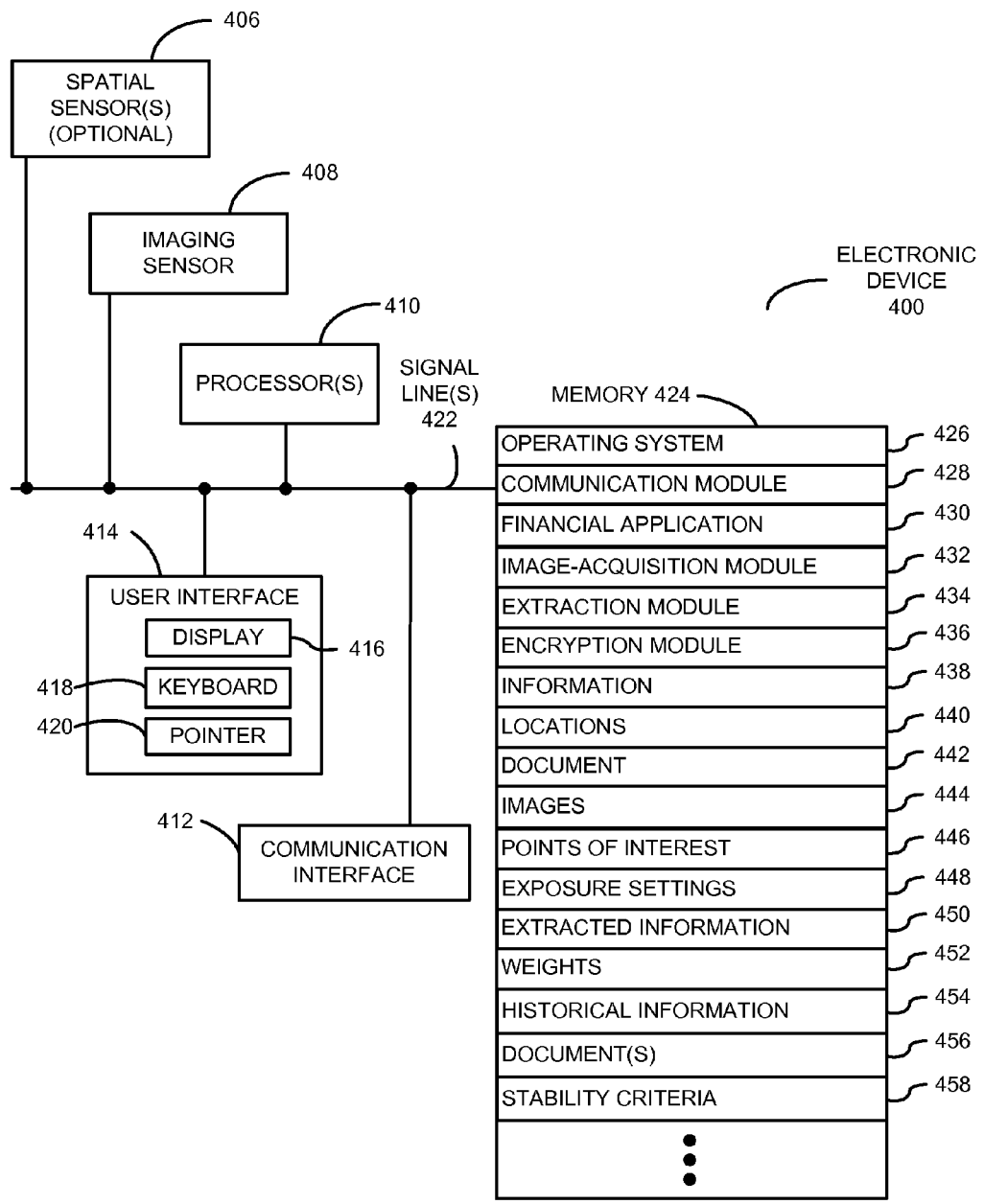
FIG. 4 is a block diagram illustrating an electronic device that performs the method of FIG. 1 in accordance with an embodiment of the present disclosure.

We now describe embodiments of the information-extraction technique, which may be performed by an electronic device (such as electronic device 400 in FIG. 4). FIG. 1 presents a flow chart illustrating a method 100 for extracting information. During operation, the electronic device (or an application executing on the electronic device) provides an instruction to a user to point an imaging device, which is integrated into the electronic device, at a location on a document (operation 110). For example, the document may include a financial document (such as: an invoice, a paycheck, a bill, a W-2 form and/or a financial vehicle) and/or the application may include a financial application. Therefore, the location may include a field with: an account number, an amount due, and/or a due date.

After providing the instruction, the electronic device captures multiple images of the document (operation 112), where each of the images has an associated exposure setting with a different point of interest proximate to the location. As described further below with reference to FIG. 2, the images may correspond to subsets of a field of view of the imaging sensor. For example, a number of images may be the square of an integer. Thus, there may be 4, 9 or 16 images. Therefore, when acquiring the images, the electronic device may adjust, based on the points of interest, the subsets of the field of view (or image-capture zones) that are associated with the imaging device and/or the application. This may restrict the amount of information in each image, which may make subsequent extraction of the information simpler and/or more accurate.

Then, the electronic device stores the images and the points of interest (operation 114). For example, the images and the points of interest may be stored in a computer-readable memory.

Furthermore, the electronic device analyzes the images to extract the information proximate to the location on the document (operation 116). Note that the analysis may include optical character recognition. Moreover, a contribution of a given image in the analysis may be based on a corresponding weight. As described further below with reference to FIG. 3, this weight may be based on a distance between a point of interest of the given image and a location of the information. For example, the weight may be larger when the distance is smaller. Alternatively or additionally, the weight may be based on differences between the information extracted from the given image and the other images.

In some embodiments, the analysis is optionally based on historical information previously extracted from other documents. For example, if similar information has been previously extracted from another instance of the document, then this previously extracted information can be used during the analysis to identify and/or to correct an error(s). Thus, if the document is a paycheck, the employer name, which was extracted from a previous paycheck, may be used to correct an error that occurred during extraction of the employer name from the current paycheck.

In some embodiments, the electronic device optionally erases the images after performing the analysis (operation 118).

Moreover, the images may be acquired without the user performing an additional action, such as activating a physical button or a virtual icon (and, more generally, an image-activation mechanism) for the imaging sensor. In particular, the electronic device may acquire the images when spatial-position information associated with the electronic device (such as spatial-position information associated with an accelerometer and/or a gyroscope integrated in the electronic device) remains within a predefined range for a predefined time duration, i.e., the spatial position of the electronic device is stable (such as 5-10% stability for 0.5-2 s). For example, the spatial-position information may include: a position and orientation in a coordinate system (such as x, y, and z, and associated angles $\theta$, $\alpha$, $\gamma$) and/or accelerations along one or more axes. Alternatively or additionally, the electronic device may acquire the images when a focus level or focal length (which is a measure of how strongly an optical system converges or diverges light) corresponding to a focus of the imaging device is stable, i.e., when the focus level remains within a predefined range for a predefined time duration (such as within 5-10% of accurate focus for 1-2 s).

By capturing and using multiple images with the exposures set at different points to extract the information proximate to the location on the document, the information-extraction technique can improve the accuracy of the extracted information by 50%, and can reduce the time needed to complete the process by 67%. Therefore, the information-extraction technique can significantly improve the user experience when using the application and the electronic device.

In some embodiments of method 100, there may be additional or fewer operations. Moreover, the order of the operations may be changed, and/or two or more operations may be combined into a single operation.

In an exemplary embodiment, the information-extraction technique leverages the capabilities of digital cameras and imaging sensors in cellular telephones to define an image-capture zone (or a subset of the field of view) and an exposure setting, to acquire images of one or more locations on an object (such as a document) with or without user action (i.e., after the user activates or presses a physical button, a virtual icon or an image-activation mechanism associated with an imaging sensor that is normally used to take pictures, or without the user activating or pressing the physical button, the virtual icon or the image-activation mechanism). In particular, once the user has pointed the imaging sensor at a location on a document (such as a field in an invoice or a check), multiple images may be acquired. In some embodiments, the resulting images may be presented to the user who provides feedback on the image quality. If one or more images are blurry or the desired information at one of the locations is absent (for example, if the information isn't included in the image), the images may be re-acquired.

Subsequently, information in the images can be extracted using optical character recognition, and the extracted information may then be used by a financial software application such as a remote-check-deposit application or income-tax software. To facilitate this analysis, the view finder or the image-capture zone associated with the imaging sensor (as specified by the application) may be adjusted when the images are acquired. For example, the view finder or the image-capture zone may be adjusted based on a size of a field associated with a given location. This field may be predefined so that the desired information associated with the given location is captured in the corresponding images. For example, if the given location is an account number, the field may be a rectangular block or region that includes the account number, and the view finder or the image-capture zone may be adjusted accordingly so that the account number is included in at least some of the images. However, if the location is an address, the view finder may display a larger square to cover the three or four lines in a typical address field. In conjunction with acquiring multiple images, this adjustment of the view finder may significantly increase user satisfaction when using the application.

During operation of the application, the application executing on the electronic device may display or present the view finder on a screen or a display of the electronic device. In response to instructions from the application, such as a verbal prompt or a message displayed on the screen, the user may point the imaging sensor toward a location or an area of interest (e.g., an account number), and this area may be displayed in the view finder on the screen. Then, the application and/or the electronic device may provide a signal to the imaging sensor, which then takes multiple pictures of the area of interest, each of which may have an exposure at a different location in the image.

In some embodiments, even if ambient light is sufficient to acquire the images, the application may also activate an integrated flash or light to increase the quality of the image. Thus, the flash may be selectively triggered by the application and/or the electronic device based on a focus level that corresponds to a focus of the imaging sensor and/or the exposure setting (which may include a time duration that light is captured by the imaging device). This may make subsequent extraction of information in the images simpler and/or more accurate.

In an exemplary embodiment, a customer (John) uses the application to pay a bill. When John receives a physical bill, he may activate the application (which is sometimes referred to as 'Flashpay') on his cellular telephone. In response to displayed instructions, John may center an account number on the bill in the view finder shown on the screen of the cellular telephone. Then, Flashpay may instruct or signal the imaging sensor to take multiple, different pictures or to acquire multiple, different images of the region displayed in the view finder by internally setting the exposure to different points of interest in the field of view. Note that the number of pictures may be determined based on a resolution of the imaging sensor. As noted previously, Flashpay may also enable or disable the flash based on the focus level and/or the exposure setting.

After the images have been acquired, Flashpay may process the images using optical character recognition. For example, by combing scanned text (and, more generally, extracted information) from some or all of the images (which may leverage relative distances of the points of exposure from the location and/or historical data), FlashPay may predict the correct result with a high certainty.

After the information is extracted, Flashpay may show the resulting text to John. If he feels that this is not the data that was needed, John can re-point the imaging sensor at the object, which will result in another series of images being acquired. Moreover, John may repeat the aforementioned operations for other locations on the bill, such as locations corresponding to the address of the biller, the bill due date, and the amount billed. Once Flashpay has processed the images, it may have the information needed to pay the bill.

Note that in the preceding example John did not have to take a picture of the whole bill and he did not have to send the images for remote processing. Instead, by acquiring multiple images, his cellular telephone was able to perform the optical character recognition to extract the desired information.

Figure 2:
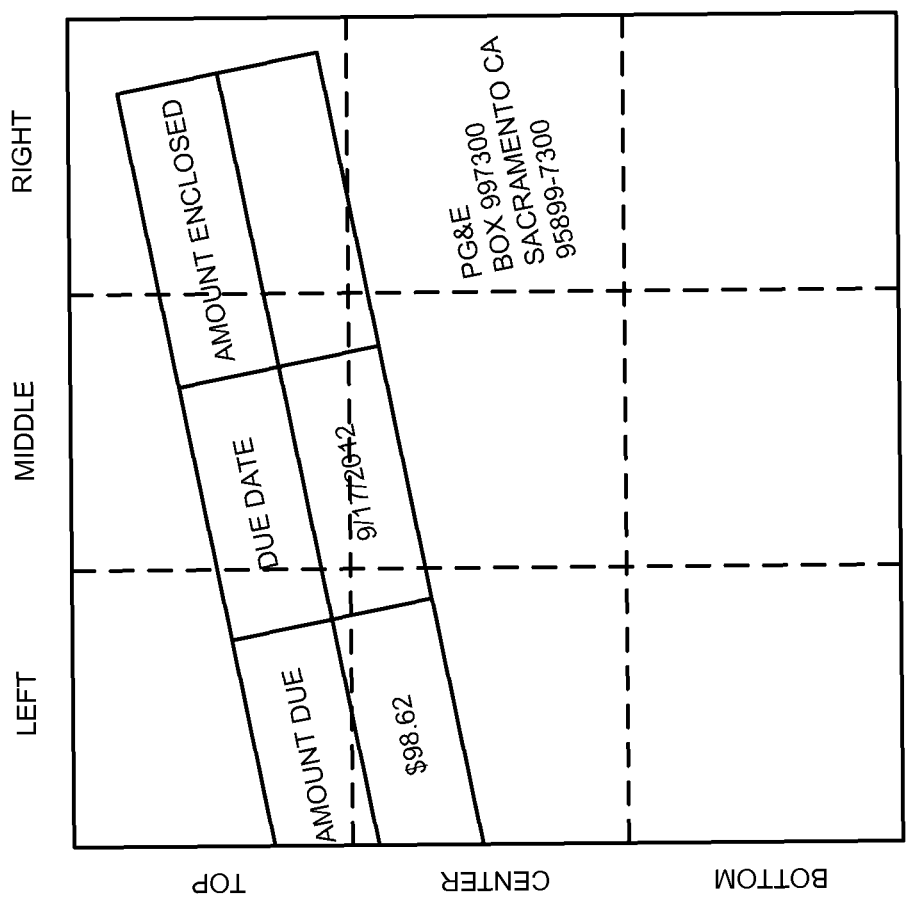
FIG. 2 is a drawing of an image of a document illustrating subsets of a field of view of an imaging sensor in accordance with an embodiment of the present disclosure.

We now describe the definition of subsets of the field of view and the extraction of the information using the acquired images in more detail. FIG. 2 presents a drawing of an image 200 of a document illustrating subsets of a field of view of an imaging sensor. In this example, the field of view has been divided into nine blocks or regions, including three rows and three columns. For clarity in the subsequent discussion, the rows are named: top, center and bottom; and the columns are named: left, middle and right.

Note that the number of subsets (or blocks) in this example is only for purposes of illustration. Therefore, in other embodiments there may be a different number of subsets (including other than a power of an integer). For example, if an imaging sensor has higher resolutions, then sixteen or more blocks may be used.

After determining the number of subsets, the electronic device may capture nine images with the exposure set in the center of each of the blocks (i.e., in the center of top-left block, the top-middle block, the top right-block, the center-left block, the center-middle block, the center-right block, the bottom-left block, the bottom-middle block and the bottom-right block). Note that each of the images may have an associated identifier denoting the point of interest and/or the location of exposure setting for that image.

The nine images may then be processed using optical character recognition. In particular, the results of optical character recognition on some or all of the nine images may be used to perform error correction and prediction. This is illustrated in FIG. 3, which presents a drawing 300 illustrating method 100 (FIG. 1) using the subsets of the field of view in FIG. 2.

Figure 3:
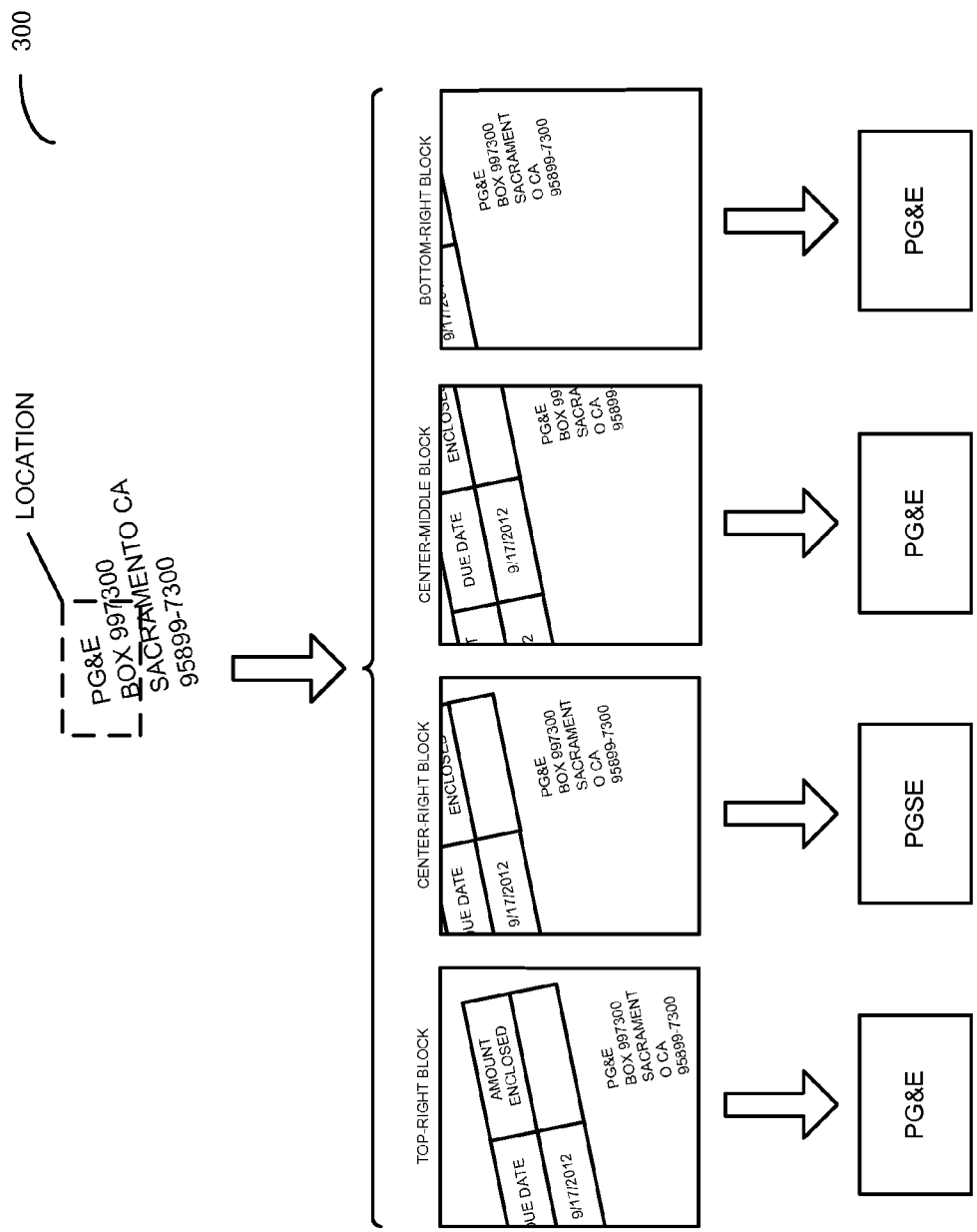
FIG. 3 is a drawing illustrating the method of FIG. 1 using the subsets of the field of view in FIG. 2 in accordance with an embodiment of the present disclosure.

In FIG. 3, an extraction module in the electronic device (such as an optical character recognition engine or module) checks if the extracted information from some or all nine of the images is the same. If any of the extracted information is not consistent with the other eight images, the extraction module may check the results from the other eight images to determine the correct extracted information and the associated accuracy probability. For example, if the issue or problem occurred with the center-right image, then when calculating the result, the weighting of images having points of interest in the adjoining blocks (i.e., the top-right block, the center-middle block, and the bottom-right block) may be increased (e.g., the information extracted from the other blocks may be used to determine the result). In addition, historical data may be used to determine if there was a match previously (i.e., if the correct information was extracted previously or is known). Alternatively, if the issue or problem occurred with the bottom-left image, then when calculating the result, the weighting of images having points of interest in the adjoining blocks (i.e., the center-left block, the center-middle block, and the bottom-middle block) may be increased. Thus, by using the extracted information from multiple images, the accuracy of the extracted information can be improved.

As shown in FIG. 3, if the information at the location is "PG&E" and the optical character recognition result from one image is "PGSE" and from three other adjacent images is "PG&E," there is a high probability that the correct result is "PG&E." This result can also be validated against stored historical data. However, if this result was extracted for the first time, then it may be added to the historical data for future reference. In this way, the information extraction technique may facilitate the building of a data structure that, over time, can be used to improve the accuracy of extracted information.

In an exemplary embodiment, adjoining subsets or blocks (i.e., subsets or blocks that are immediately adjacent to or share an edge with a given image) are given higher weight when correcting possible errors from a given image of a block that includes a point of interest proximate to the location. For example, suppose an error is suspected in the extracted information from the top-middle block. Because there are three adjoining blocks (the top-right block, the top-left block and the center-middle block), the weight for each of these blocks may each be ⅓. Similarly, because there are five non-adjoining blocks (the center-left block, the center-right block, the bottom-left block, the bottom-middle block and the bottom-right block), the weight for each of these blocks may each be ⅕. In another example, if an error is suspected in the extracted information from the top-right block, the weight for each of the adjoining blocks may be ½ (because there are two adjoining blocks), and the weight for each of the non-adjoining blocks may be ⅙ (because there are six non-adjoining blocks).

FIG. 4 presents a block diagram illustrating an electronic device 400 that performs method 100 (FIG. 1). Electronic device 400 includes one or more processing units or processors 410, a communication interface 412, a user interface 414, and one or more signal lines 422 coupling these components together. Note that the one or more processors 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in electronic device 400 may include volatile memory and/or non-volatile memory. More specifically, memory 424 may include: ROM, RAM, EPROM, EEPROM, flash memory, one or more smart cards, one or more magnetic disc storage devices, and/or one or more optical storage devices. Memory 424 may store an operating system 426 that includes procedures (or a set of instructions) for handling various basic system services for performing hardware-dependent tasks. Memory 424 may also store procedures (or a set of instructions) in a communication module 428. These communication procedures may be used for communicating with one or more computers and/or servers, including computers and/or servers that are remotely located with respect to electronic device 400.

Memory 424 may also include multiple program modules (or sets of instructions), including: financial application 430 (or a set of instructions), image-acquisition module 432 (or a set of instructions), extraction module 434 (or a set of instructions), and/or encryption module 436 (or a set of instructions). Note that one or more of these program modules (or sets of instructions) may constitute a computer-program mechanism.

During method 100 (FIG. 1), financial application 430 (and, more generally, an arbitrary software application) may be launched based on a user command. For example, the user may launch financial application 430 by clicking on a physical button in keyboard 418 or a virtual icon associated with financial application 430 that is displayed on display 416.

Then, financial application 430 provides information 438 (such as an instruction) to the user to point an imaging sensor 408, which is integrated into electronic device 400, to one of locations 440 on a document 442. For example, financial application 430 may present information on display 416.

Subsequently, image-acquisition module 432 may communicate a signal to imaging sensor 408 to acquire images 444. Each of the images 444 has an associated one of points of interest 446 proximate to the one of locations 440 and an associated one of exposure settings 448. In particular, image-acquisition module 432 may adjust, based on points of interest 446, the subsets of the field of view (or image-capture zones) that are associated with imaging device 408 and financial application 430 (such as the one of locations 440). Then, image-acquisition module 432 may store images 444, points of interest 446 and/or exposure settings 448 in memory 424.

Next, extraction module 434 analyzes images 444 to extract information 450 proximate to the one of locations 440 on document 442. For example, information 450 may be extracted using optical character recognition. Note that the contributions of images 444 during the analysis may be specified by weights 452 associated with images 444. These weights may be based on distances between one of points of interest 446 of the given image and the one of locations 440. Alternatively, weights 452 may be based on differences between information 450 extracted from the given image and the other images.

In some embodiments, the analysis is based on historical information 454 previously extracted from one or more other documents 456. For example, if similar information has been previously extracted from another instance of the document, then this previously extracted information can be used during the analysis.

Figure 5:
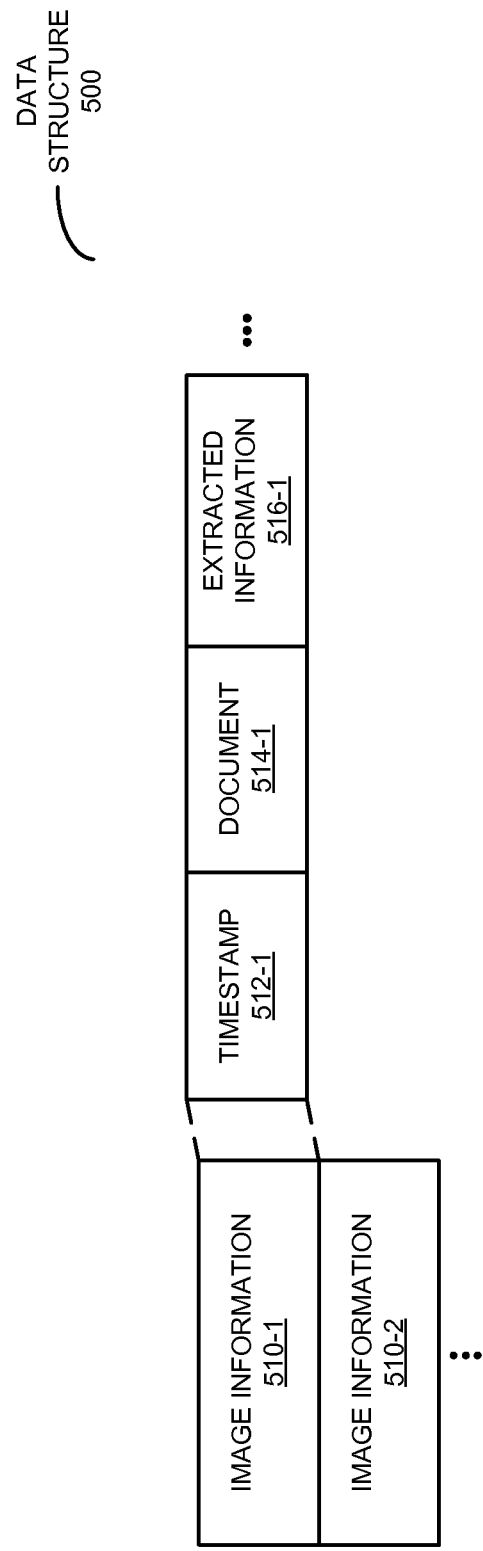
FIG. 5 is a block diagram illustrating a data structure for use with the electronic device of FIG. 4 in accordance with an embodiment of the present disclosure.

The history information, as well as information about the document, the images, the points of interest and/or the exposure settings, may be included in a data structure. This is shown in FIG. 5, which presents a data structure 500 that includes image information 510 associated with the information-extraction technique. In particular, image information 510-1 includes: a timestamp 512-1 (which may be specified by a system clock), a document 514-1, and/or extracted information 516-1.

Referring back to FIG. 4, after information 450 is extracted, extraction module 434 may optionally erase images 444, points of interest 446 and/or exposure settings 448. Additionally, extracted information 450 may subsequently be used by financial application 430. For example, financial application 430 may use information 450 to perform a financial calculation and/or to complete a financial form (such as an income-tax return).

As noted previously, images 444 may be acquired without the user performing an additional action, such as activating a physical button or a virtual icon (and, more generally, an image-activation mechanism) for imaging sensor 408. For example, image-acquisition module 432 may communicate the signal to imaging sensor 408 to acquire images 444 based on one or more stability criteria 458, such as a focus stability and/or a spatial-stability criteria (which may be based on spatial-position information provided by one or more optional spatial sensors 406, e.g., an accelerometer and/or a gyroscope integrated in electronic device 400).

Because information in electronic device 400 may be sensitive in nature, in some embodiments at least some of the data stored in memory 424 and/or at least some of the data communicated using communication module 428 is encrypted using encryption module 436.

Instructions in the various modules in memory 424 may be implemented in: a high-level procedural language, an object-oriented programming language, and/or in an assembly or machine language. Note that the programming language may be compiled or interpreted, e.g., configurable or configured, to be executed by the one or more processors 410.

Although electronic device 400 is illustrated as having a number of discrete items, FIG. 4 is intended to be a functional description of the various features that may be present in electronic device 400 rather than a structural schematic of the embodiments described herein. In practice, and as recognized by those of ordinary skill in the art, the functions of electronic device 400 may be distributed over a large number of servers or computers, with various groups of the servers or computers performing particular subsets of the functions. In some embodiments, some or all of the functionality of electronic device 400 may be implemented in one or more application-specific integrated circuits (ASICs) and/or one or more digital signal processors (DSPs).

Electronic device 400 may include one of a variety of devices capable of manipulating computer-readable data or communicating such data between two or more computing systems over a network, including: a personal computer, a laptop computer, a tablet computer, a mainframe computer, a portable electronic device (such as a cellular phone or PDA), a digital camera, a server and/or a client computer (in a client-server architecture). Moreover, electronic device 400 may be capable of communication via a network, such as: the Internet, World Wide Web (WWW), an intranet, a cellular-telephone network, LAN, WAN, MAN, or a combination of networks, or other technology enabling communication between computing systems.

In some embodiments one or more of the modules in memory 424 (such as image-acquisition module 432) may be associated with and/or included in financial application 430. This financial application may include: Quicken™ and/or TurboTax™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, financial application 430 may include: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), Tally.ERP (from Tally Solutions, Ltd., of Bangalore, India) and/or other payroll or accounting software capable of processing payroll information.

Electronic device 400 may include fewer components or additional components. Moreover, two or more components may be combined into a single component, and/or a position of one or more components may be changed. In some embodiments, the functionality of electronic device 400 may be implemented more in hardware and less in software, or less in hardware and more in software, as is known in the art.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic-device-implemented method for extracting information from a document, comprising:
   sending an instruction to a user to point an imaging device, which is integrated into the electronic device, at a location on the document;
   subsequent to sending the instruction, sending a signal to the imaging device;
   upon receiving the signal from the electronic device, capturing multiple images of the document without requiring the user to perform an additional action, wherein each of the images has an associated exposure setting with a different point of interest proximate to the location;
   storing the images and the points of interest; and
   using the electronic device, analyzing the images to extract the information proximate to the location on the document.

2. The method of claim 1, wherein the analysis includes optical character recognition.

3. The method of claim 1, wherein a contribution of a given image in the images in the analysis is based on a corresponding weight; and
   wherein the weight is based on a distance between a point of interest of the given image and a location of the information.

4. The method of claim 3, wherein the weight is larger when the distance is smaller.

5. The method of claim 1, wherein a contribution of a given image in the images in the analysis is based on a corresponding weight; and
   wherein the weight is based on differences between the information extracted from the given image and the other images.

6. The method of claim 1, wherein the analysis is further based on historical information previously extracted from other documents.

7. The method of claim 1, wherein the document includes a financial document.

8. The method of claim 1, wherein the method further comprises erasing the images after performing the analysis.

9. The method of claim 1, wherein the images correspond to subsets of a field of view of the imaging sensor.

10. The method of claim 9, wherein a number of images is the square of an integer.

11. A computer-program product for use in conjunction with an electronic device, the computer-program product comprising a non-transitory computer-readable storage medium and a computer-program mechanism embedded therein, to facilitate extraction of information from a document, the computer-program mechanism including:
- instructions for sending an instruction to a user to point an imaging device, which is integrated into the electronic device, at a location on the document;
- instructions for enabling the electronic device to send a signal to the imaging device subsequent to sending the instruction;
- instructions for the imaging device to capture multiple images of the document upon receiving the signal from the electronic device without requiring the user to perform an additional action, where each of the images has an associated exposure setting with a different point of interest proximate to the location;
- instructions for storing the images and the points of interest; and
- instructions for analyzing the images to extract the information proximate to the location on the document.

12. The computer-program product of claim 11, wherein the analysis includes optical character recognition.

13. The computer-program product of claim 11, wherein a contribution of a given image in the images in the analysis is based on a corresponding weight; and
wherein the weight is based on a distance between a point of interest of the given image and a location of the information.

14. The computer-program product of claim 13, wherein the weight is larger when the distance is smaller.

15. The computer-program product of claim 11, wherein a contribution of a given image in the images in the analysis is based on a corresponding weight; and
wherein the weight is based on differences between the information extracted from the given image and the other images.

16. The computer-program product of claim 11, wherein the analysis is further based on historical information previously extracted from other documents.

17. The computer-program product of claim 11, wherein the computer-program mechanism further includes instructions for erasing the images after performing the analysis.

18. The computer-program product of claim 11, wherein the images correspond to subsets of a field of view of the imaging sensor.

19. The computer-program product of claim 18, wherein a number of images is the square of an integer.

20. An electronic device, comprising:
- a processor;
- memory; and
- a program module, wherein the program module is stored in the memory and configurable to be executed by the processor to facilitate extracting information from a document, the program module including:
  - instructions for sending an instruction to a user to point an imaging device, which is integrated into the electronic device, at a location on the document;
  - instructions for enabling the electronic device to send a signal to the imaging device subsequent to sending the instruction;
  - instructions for the imaging device to capture multiple images of the document upon receiving the signal from the electronic device without requiring the user to perform an additional action, where each of the images has an associated exposure setting with a different point of interest proximate to the location;
  - instructions for storing the images and the points of interest; and
  - instructions for analyzing the images to extract the information proximate to the location on the document.

* * * * *